(12) United States Patent
Kim et al.

(10) Patent No.: US 11,467,048 B2
(45) Date of Patent: Oct. 11, 2022

(54) PRESSURE SENSOR FOR SENSING PRESSURE IN VERTICAL DIRECTION, STRAIN SENSOR FOR SENSING TENSION IN HORIZONTAL DIRECTION, AND METHOD FOR MANUFACTURING SENSORS

(71) Applicant: FOUNDATION OF SOONGSIL UNIVERSITY INDUSTRY COOPERATION, Seoul (KR)

(72) Inventors: Joo Yong Kim, Seoul (KR); Min Ki Choi, Incheon (KR)

(73) Assignee: FOUNDATION OF SOONGSIL UNIVERSITY INDUSTRY COOPERATION, Seoul (KR)

( * ) Notice: Subject to any disclaimer, the term of this patent is extended or adjusted under 35 U.S.C. 154(b) by 135 days.

(21) Appl. No.: 16/649,071

(22) PCT Filed: Feb. 6, 2018

(86) PCT No.: PCT/KR2018/001593
§ 371 (c)(1),
(2) Date: Mar. 19, 2020

(87) PCT Pub. No.: WO2019/059468
PCT Pub. Date: Mar. 28, 2019

(65) Prior Publication Data
US 2020/0264058 A1    Aug. 20, 2020

(30) Foreign Application Priority Data
Sep. 20, 2017   (KR) .................. 10-2017-0121130
Sep. 20, 2017   (KR) .................. 10-2017-0121131

(51) Int. Cl.
*G01L 1/22*      (2006.01)
*G01L 9/04*      (2006.01)

(52) U.S. Cl.
CPC .............. *G01L 1/2287* (2013.01); *G01L 9/04* (2013.01)

(58) Field of Classification Search
CPC ......................................................... G01L 9/04
USPC ..................................................... 73/862.632
See application file for complete search history.

(56) References Cited

U.S. PATENT DOCUMENTS

| 8,590,389 B2 | 11/2013 | Hsu et al. |
| 8,943,897 B2 * | 2/2015 | Beauvais ............. A61B 5/1126 73/777 |
| 10,267,690 B2 * | 4/2019 | Wu ........................ G01L 1/146 |
| 2013/0118267 A1 | 5/2013 | Suzuki et al. |

FOREIGN PATENT DOCUMENTS

| KR | 10-20150096316 A | 8/2015 |
| KR | 101554543 B1 | 9/2015 |
| KR | 10-20170028171 A | 3/2017 |

OTHER PUBLICATIONS

International Search Report_PCT/KR2018/001593.

* cited by examiner

*Primary Examiner* — Nathaniel T Woodward

(57) ABSTRACT

Disclosed are a pressure sensor for sensing pressure in a vertical direction, a strain sensor for sensing tension in a horizontal direction, and a method for manufacturing the sensors. The disclosed pressure sensor includes a plurality of pressure sensor units stacked in multiple layers, and at least one of a pressure elastic modulus and an amount of conductive particles per unit area of each of the plurality of pressure sensor units is different from each other.

15 Claims, 13 Drawing Sheets

[Figure 1]
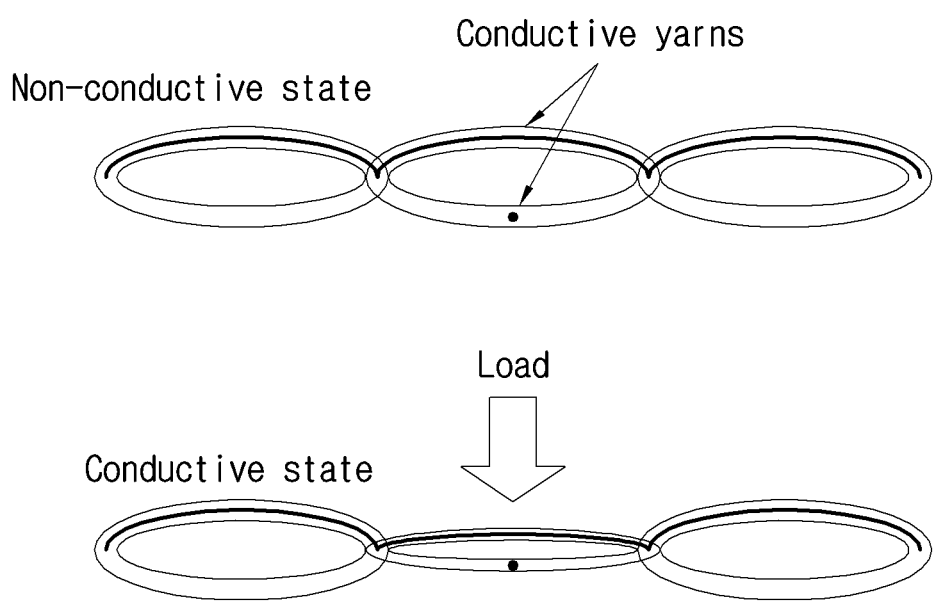

【Figure 2A】
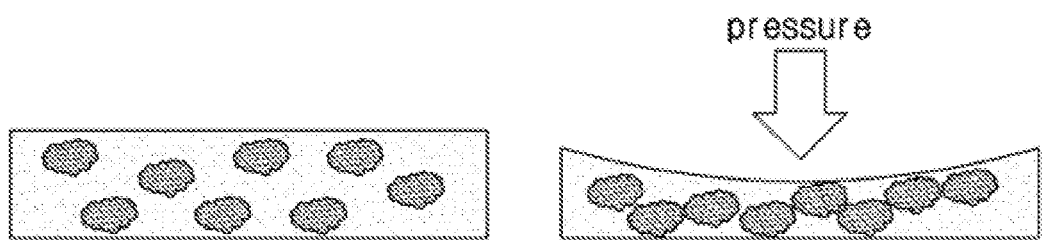
【Figure 2B】
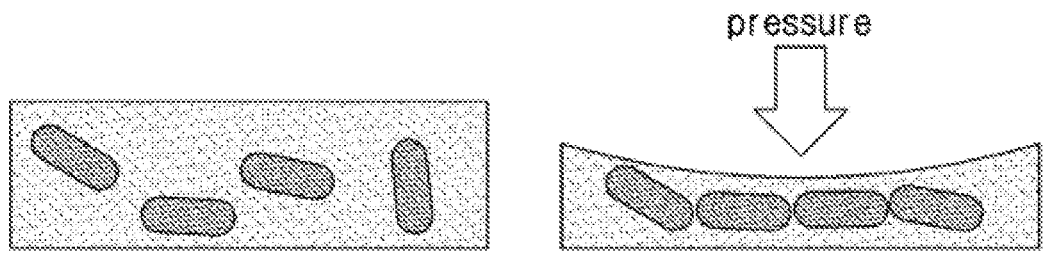

【Figure 3】
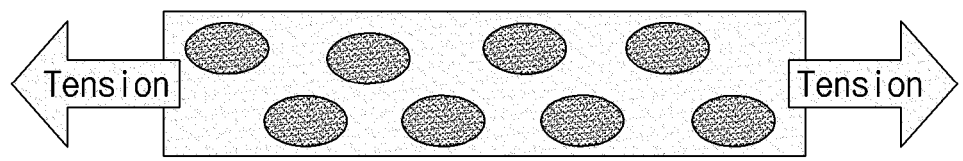

【Figure 4A】
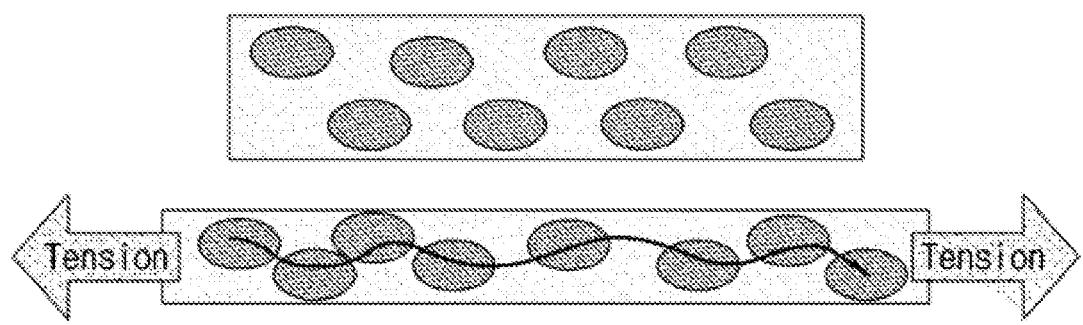
【Figure 4B】
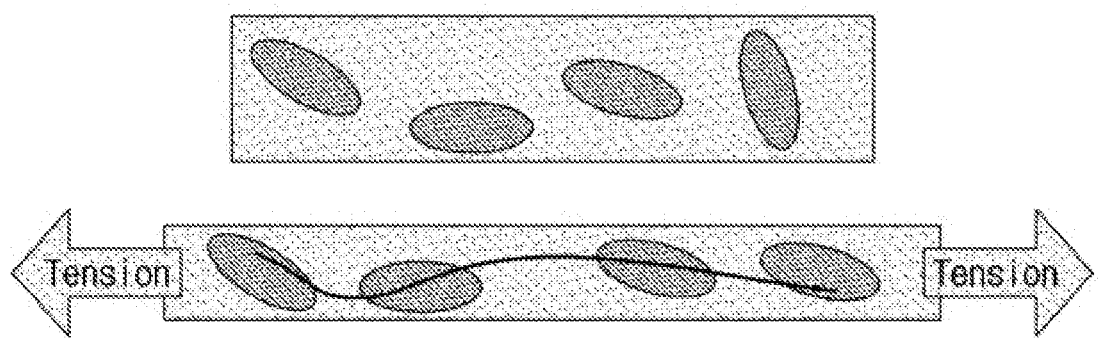

【Figure 5】
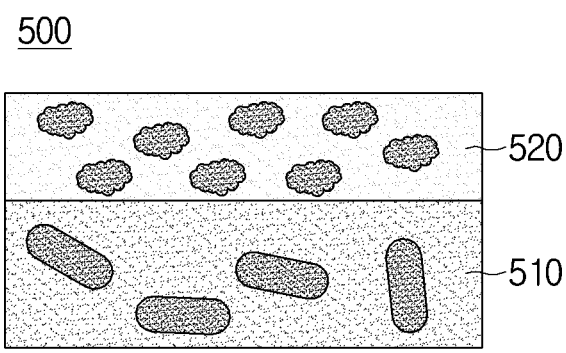

【Figure 6A】
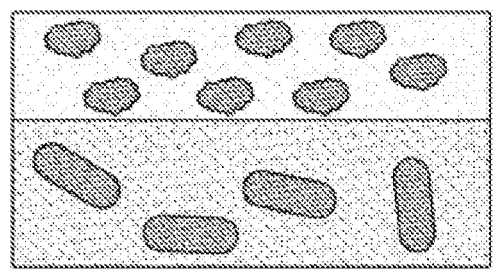
【Figure 6B】
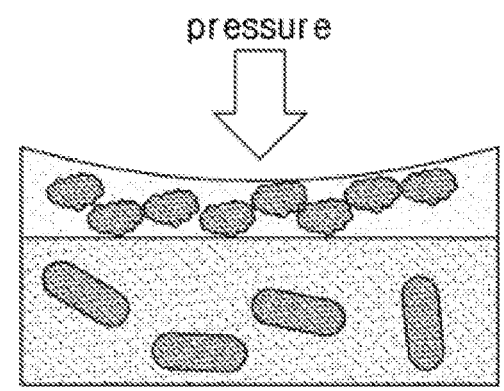
【Figure 6C】
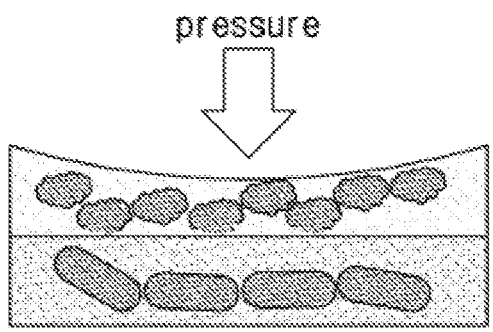

[Figure 7]
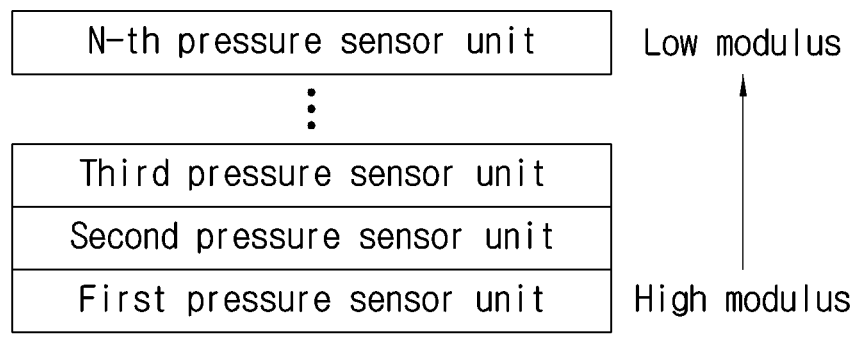

[Figure 8]
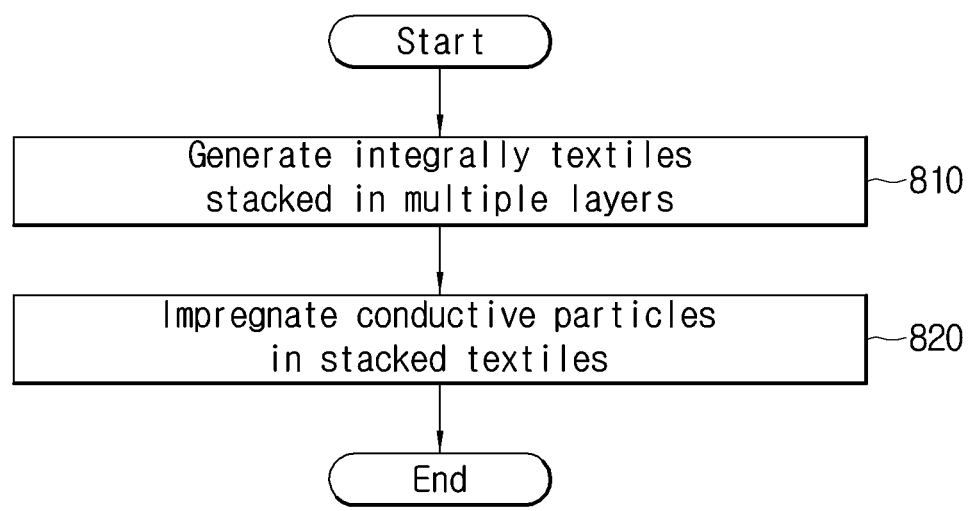

【Figure 9】
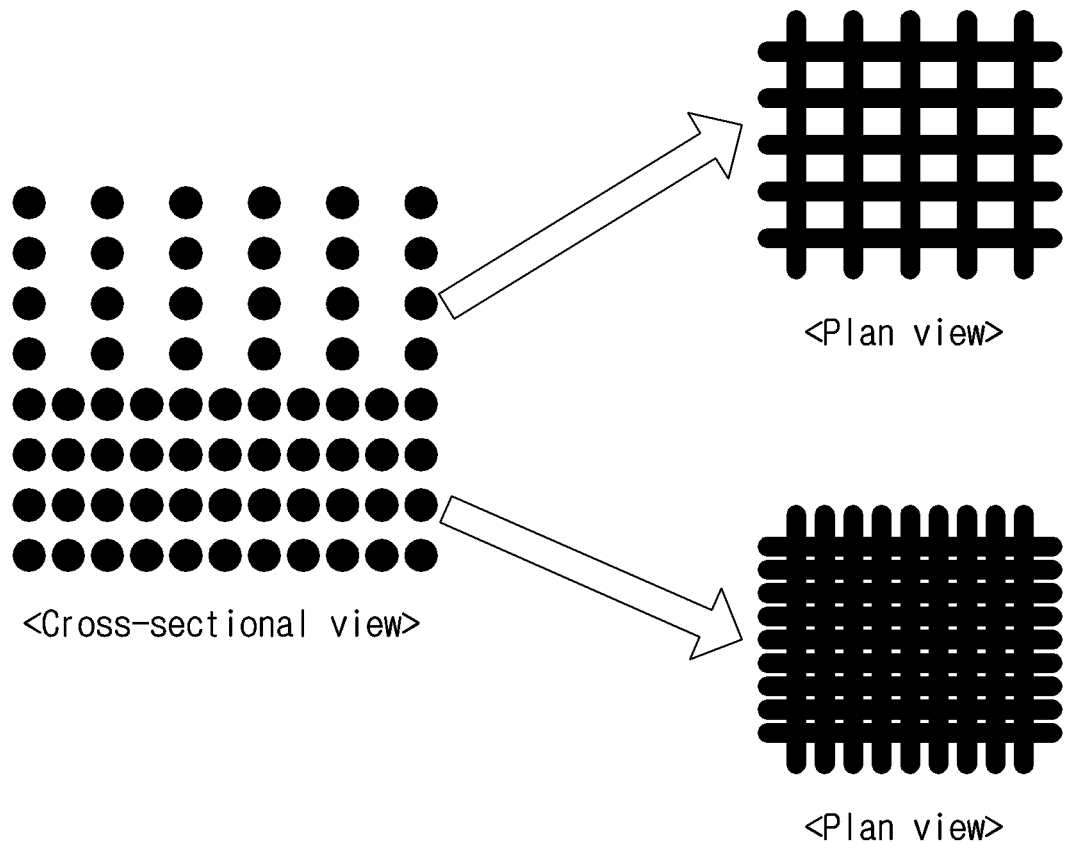

[Figure 10]
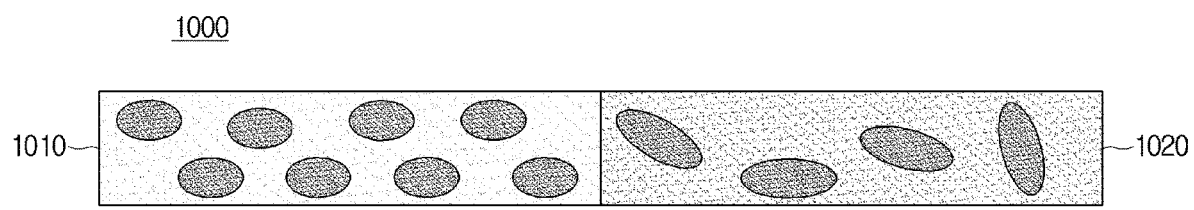

[Figure 11A]
[Figure 11B]
[Figure 11C]

[Figure 12]
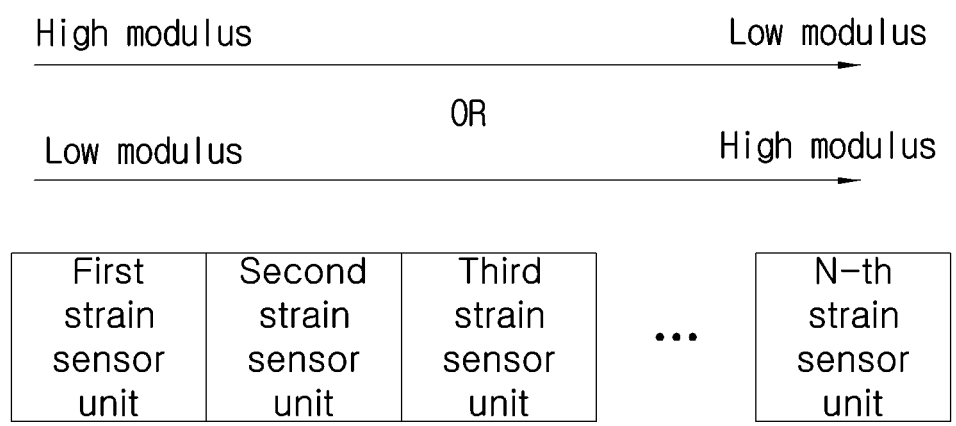

【Figure 13】
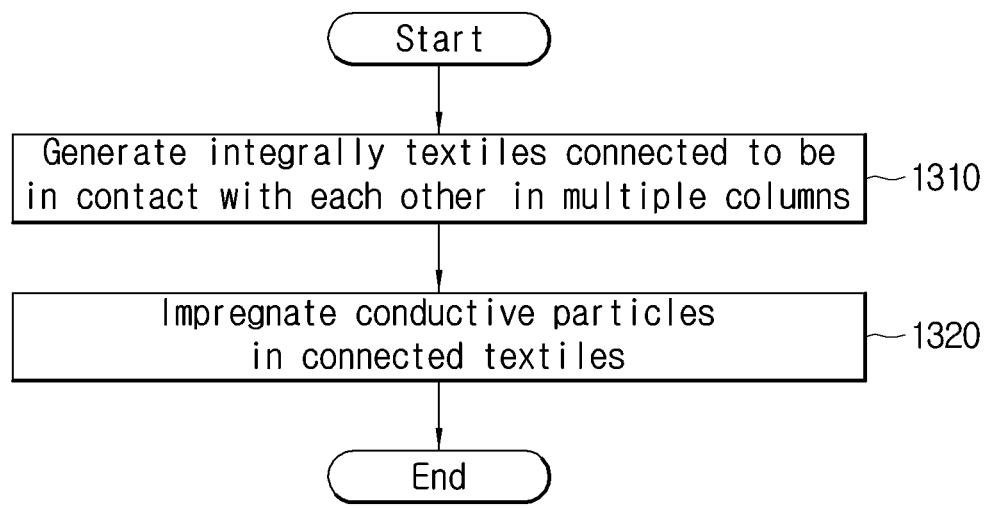
【Figure 14】
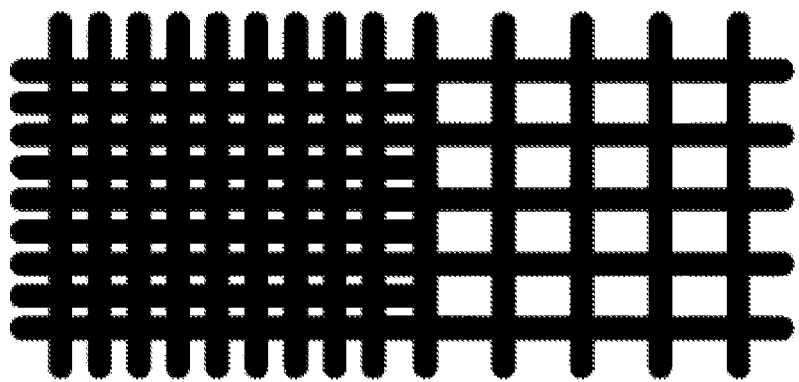

PRESSURE SENSOR FOR SENSING PRESSURE IN VERTICAL DIRECTION, STRAIN SENSOR FOR SENSING TENSION IN HORIZONTAL DIRECTION, AND METHOD FOR MANUFACTURING SENSORS

CROSS-REFERENCE TO RELATED APPLICATIONS

This application is a National Stage Entry of PCT International Application No. PCT/KR2018/001593, which was filed on Feb. 6, 2018, and which claims priority from and the benefit of Korean Patent Application No. 10-2017-0121130, filed with the Korean Intellectual Property Office on Sep. 20, 2017, and Korean Patent Application No. 10-2017-0121131, filed with the Korean Intellectual Property Office on Sep. 20, 2017, each of which is hereby incorporated by reference in its entirety.

TECHNICAL FIELD

The present disclosure relates to a pressure sensor for sensing pressure in a vertical direction to implement various sensing performance, a strain sensor for sensing tension in a horizontal direction to implement various sensing performance, and a method for manufacturing the sensors.

BACKGROUND ART

A pressure sensor is a device for sensing pressure in a vertical direction, exists in various types according to a principle of sensing the pressure, for example, a piezoresistive pressure sensor, a piezoelectric pressure sensor, a capacitive pressure sensor, a textile pressure sensor, etc.

In particular, the textile pressure sensor has a single-layer structure and a structure in which fibers (conductive fibers) containing conductive particles are disposed on upper and lower portions of a multilayer structure fabric (which may be a knitted or nonwoven fabric as a fiber structure of two or more layers to cross each other without a contact).

FIG. 1 is a diagram illustrating the single-layer textile pressure sensor described above. Referring to FIG. 1, when the pressure is applied to the textile pressure sensor, the pressure is sensed using a phenomenon in which the conductive particles in the fiber move and a resistance changes according to a change in distance between the conductive particles.

The textile pressure sensor adjusts the pressure sensitivity in accordance with a pressure elastic modulus or an amount of conductive particles contained in the fiber. That is, the smaller the pressure elastic modulus or the larger the amount of conductive particles, the higher the pressure sensitivity, and the larger the pressure elastic modulus or the smaller the amount of the conductive particles, the lower the pressure sensitivity. This is as illustrated in FIGS. 2A and 2B.

In other words, a textile pressure sensor (FIG. 2A) having a low elastic modulus or a large amount of conductive particles is a sensor having high pressure sensitivity, and has low minimum sensing pressure and maximum sensing pressure. In other words, the textile pressure sensor with high pressure sensitivity is characterized by being able to respond to low pressure, but not to respond to high pressure.

In addition, a textile pressure sensor (FIG. 2B) having a high elastic modulus or a small amount of conductive particles is a sensor having high pressure sensitivity, and has high minimum sensing pressure and maximum sensing pressure. In other words, the textile pressure sensor with low pressure sensitivity is characterized by being able to respond to high pressure but not to respond to low pressure.

That is, the conventional general single-layer textile pressure sensor described above has a problem in that a range of the sensing pressure is limited because both the minimum sensing pressure and the maximum sensing pressure are low (FIG. 2A) or both the minimum sensing pressure and the maximum sensing pressure are high (FIG. 2B).

On the other hand, a strain sensor or a strain gauge is a sensor that senses mechanical minute changes (strains) with an electrical signal, and in particular, may sense tension in a horizontal direction. When the strain sensor is attached to the surface of a machine or structure, it is possible to measure a change (strain) in small dimension that occurs on the surface thereof and determine stress important for confirming the strength or safety from the magnitude thereof.

Conventional strain sensors are made of textile or polymeric materials. At this time, when the tension is applied to the strain sensor, as illustrated in FIG. 3, the resistance is changed as the position of the conductive particles included in the textile material or the polymer material is changed, and the tension is sensed by measuring the resistance.

At this time, in the conventional strain sensors, the tension sensitivity or gauge factor is adjusted according to a tension elastic modulus or an amount of conductive particles included in the fiber. That is, the smaller the tension elastic modulus or the larger the amount of conductive particles, the higher the gauge factor, and the larger the tension elastic modulus or the smaller the amount of the conductive particles, the lower the gauge factor.

FIGS. 4A and 4B illustrate a conventional strain sensor (FIG. 4A) having a low tension elastic modulus or a large amount of conductive particles and a conventional strain sensor (FIG. 4B) having a high tension elastic modulus or a small amount of conductive particles.

Referring to FIGS. 4A and 4B, the strain sensor (FIG. 4A) having the low tension elastic modulus or the large amount of conductive particles is a sensor having high tension sensitivity, and has low minimum sensing tension and maximum sensing tension. In other words, the strain sensor having the low tension elastic modulus is characterized by being able to respond to low tension, but not to respond to high tension.

In addition, the strain sensor (FIG. 4B) having the high tension elastic modulus or the small amount of conductive particles is a sensor having low tension sensitivity, and has high minimum sensing tension and maximum sensing tension. In other words, the strain sensor having the high tension elastic modulus is characterized by being able to respond to high tension, but not to respond to low tension.

That is, the conventional strain sensor described above has a problem in that a range of the sensing tension is limited because both the minimum sensing tension and the maximum sensing tension are low (FIG. 4A) or both the minimum sensing tension and the maximum sensing tension are high (FIG. 4B).

DISCLOSURE

Technical Problem

The present disclosure is directed to provide a pressure sensor for sensing pressure in a vertical direction to implement various sensing performance, a strain sensor for sensing tension in a horizontal direction to implement various sensing performance, and a method for manufacturing the sensors.

Other objects of the present disclosure may be derived by those skilled in the art through the following exemplary embodiments.

Technical Solution

In order to achieve the objects, according to an exemplary embodiment of the present disclosure, there is provided a pressure sensor for sensing pressure in a vertical direction comprising a plurality of pressure sensor units stacked in multiple layers, wherein at least one of a pressure elastic modulus and an amount of conductive particles per unit area of each of the plurality of pressure sensor units is different from each other.

According to another exemplary embodiment of the present disclosure, there is provided a strain sensor for sensing tension in a horizontal direction comprising a plurality of strain sensor units connected to be in contact with each other in a left and right direction, wherein at least one of a tension elastic modulus and an amount of conductive particles per unit area of each of the plurality of strain sensor units is different from each other.

Advantageous Effects

The pressure sensor and the strain sensor according to the present disclosure have advantages capable of implementing various sensing performance.

It should be understood that the effects of the present disclosure are not limited to the effects described above, but include all effects that can be deduced from the detailed description of the present disclosure or configurations of the invention described in claims.

DESCRIPTION OF DRAWINGS

FIGS. 1, 2A and 2B are diagrams illustrating a concept of a conventional textile pressure sensor.

FIGS. 3, 4A and 4B are diagrams illustrating a concept of a conventional textile strain sensor.

FIG. 5 is a diagram illustrating a schematic configuration of a pressure sensor according to an exemplary embodiment of the present disclosure.

FIGS. 6A, 6B and 6C are a diagram for describing an operation concept of the pressure sensor according to the exemplary embodiment of the present disclosure.

FIG. 7 is a diagram illustrating a schematic configuration of a pressure sensor according to another exemplary embodiment of the present disclosure.

FIG. 8 is a diagram illustrating a flowchart of a method for manufacturing a pressure sensor according to an exemplary embodiment of the present disclosure.

FIG. 9 is a diagram for describing a concept of integrally generating textiles stacked in two layers according to an exemplary embodiment of the present disclosure.

FIG. 10 is a diagram illustrating a schematic configuration of a strain sensor according to an exemplary embodiment of the present disclosure.

FIGS. 11A, 11B and 11C are a diagram for describing an operation concept of the strain sensor according to the exemplary embodiment of the present disclosure.

FIG. 12 is a diagram illustrating a schematic configuration of a strain sensor according to another exemplary embodiment of the present disclosure.

FIG. 13 is a diagram illustrating a flowchart of a method for manufacturing a strain sensor according to an exemplary embodiment of the present disclosure.

FIG. 14 is a diagram for describing a concept of integrally generating textiles connected to each other in two columns according to an exemplary embodiment of the present disclosure.

BEST MODE

A singular form used in the present specification may include a plural form if there is no clearly opposite meaning in the context. In this specification, terms such as "comprising" or "including" should not be interpreted as necessarily including all various components or various steps disclosed in the specification, and it should be interpreted that some component or some steps among them may not be included or additional components or steps may be further included. In addition, terms including "unit", "module", and the like disclosed in the specification mean a unit that processes at least one function or operation and this may be implemented by hardware or software or a combination of hardware and software.

Hereinafter, various exemplary embodiments of the present disclosure will be described in detail with reference to the accompanying drawings.

FIG. 5 is a diagram illustrating a schematic configuration of a pressure sensor according to an exemplary embodiment of the present disclosure.

Referring to FIG. 5, a pressure sensor 500 according to an exemplary embodiment of the present disclosure as a sensor for sensing pressure in a vertical direction may be used in wearable device products (shoes, clothes, bedding, etc.), biosensors, and the like, and includes a first pressure sensor unit 510 and a second pressure sensor unit 520.

The first pressure sensor unit 510 is a single-layer pressure sensor and disposed on a first layer of the pressure sensor 500.

At this time, the first pressure sensor unit 510 may be a single-layer pressure sensor made of a textile material generated by using one method of weaving, knitting, and embroidery, and a fiber constituting the textile may be a conductive fiber or generated by impregnating or printing conductive particles in an insulating fiber.

In addition, the second pressure sensor unit 520 is also a single-layer pressure sensor and disposed on a second layer of the pressure sensor 500.

At this time, the second pressure sensor unit 520 may also be made of a single-layer textile material generated by using one method of weaving, knitting, and embroidery, and a fiber constituting the textile may be a conductive fiber or generated by impregnating or printing conductive particles in an insulating fiber.

Hereinafter, for convenience of description, it is assumed that the first pressure sensor unit 510 and the second pressure sensor unit 520 are made of textile materials. However, the present disclosure is not limited thereto.

For example, the pressure sensor 500 has a structure in which two different pressure sensor units 510 and 520 are stacked on each other. In this case, the first pressure sensor unit 510 and the second pressure sensor unit 520 may have the same height. In addition, the first pressure sensor unit 510 and the second pressure sensor unit 520 may be generated separately from each other and then stacked on each other, and the first pressure sensor unit 510 and the second pressure sensor unit 520 may be manufactured at once in a stacked structure through a continuous process. The manufacturing of the first pressure sensor unit 510 and the second pressure sensor unit 520 will be described below in detail in "a method for manufacturing a pressure sensor".

On the other hand, the first pressure sensor unit 510 and the second pressure sensor unit 520 have a pressure elastic modulus of a specific magnitude, which may be adjusted. In addition, the pressure sensitivity of the first pressure sensor unit 510 and the second pressure sensor unit 520 may be adjusted by adjusting the pressure elastic modulus. That is, when the pressure elastic modulus is low and a drape property is high, the pressure sensitivity is increased, and when the pressure elastic modulus is high and the drape property is low, the pressure sensitivity is decreased.

According to an exemplary embodiment of the present disclosure, the pressure elastic modulus of the first pressure sensor unit 510 and the pressure elastic modulus of the second pressure sensor unit 520 may be different from each other. Through this, there is an advantage of widening the range of the sensing pressure of the pressure sensor 500.

More specifically, the first pressure sensor unit 510 may be a single-layer pressure sensor having a pressure elastic modulus of a first magnitude, and the second pressure sensor unit 520 may be a single-layer pressure sensor having a pressure elastic modulus of a second magnitude smaller than the first magnitude. That is, the pressure elastic modulus of the first pressure sensor unit 510 may be larger than the pressure elastic modulus of the second pressure sensor unit 520.

In other words, referring to FIGS. 6A, 6B and 6C, in the case of configuring a multilayer pressure sensor 500 by stacking a pressure sensor having a low pressure elastic modulus thereon and a pressure sensor having a high pressure elastic modulus therebelow (FIG. 6A), when the minimum pressure is applied to the pressure sensor 500, the pressure sensor (that is, the second pressure sensor unit 520) having the low pressure elastic modulus senses a pressure change so that the sensor responds even to the minimum pressure (FIG. 6B). In addition, when the maximum pressure is applied to the pressure sensor 500, both the pressure sensor (that is, the second pressure sensor unit 520) having the low pressure elastic modulus and the pressure sensor (that is, the first pressure sensor unit 510) having the high pressure elastic modulus sense the pressure change (FIG. 6C). Therefore, there is an advantage that the pressure sensor 500 may sense both the minimum pressure and the maximum pressure (multi-sensor) and has a wider range of the sensing pressure than that of the single-layer pressure sensor.

That is, when single-layer pressure sensors having different pressure sensitivities are stacked to manufacture one pressure sensor, a high-efficiency sensor may be manufactured in which the resistance is changed even at the maximum pressure while the resistance is changed at the minimum pressure. In addition, the single-layer pressure sensors may be stacked according to a performance range required by a user to manufacture a customized pressure sensor.

Meanwhile, the pressure elastic moduli of the first pressure sensor unit 510 and the second pressure sensor unit 520 may be adjusted by controlling the fiber density of the same fiber yarn or the pressure elastic moduli of the first pressure sensor unit 510 and the second pressure sensor unit 520 may be adjusted by using different fiber yarns.

According to the exemplary embodiment of the present disclosure, in the case of using the same fiber yarn, the pressure elastic modulus may be adjusted by equalizing the amount of conductive particles per unit area and varying the fiber density. That is, the first pressure sensor unit 510 may increase the fiber density, and the second pressure sensor unit 520 may decrease the fiber density. In this case, a pressure sensor unit having a smaller density of the insulating fiber may increase the number of impregnation times and the number of printing times to equalize the amount of conductive particles per unit area.

According to another exemplary embodiment of the present disclosure, in the case of using different fiber yarns, the first pressure sensor unit 510 may be formed of a fiber yarn (for example, nylon fiber yarn) having a large pressure elastic modulus and the second pressure sensor unit 520 may be formed of a fiber yarn (for example, polyurethane fiber yarn) having a small pressure elastic modulus. At this time, the amount of conductive particles per unit area is the same.

In addition, the contents described above may also be applied to a pressure sensor in which pressure sensors of three or more single layers are stacked.

In FIG. 7, a pressure sensor including N pressure sensor units stacked in N layers (N is an integer of 2 or more) is illustrated.

Referring to FIG. 7, the pressure elastic modulus of each of the N pressure sensor units may be different from each other. In this case, the stacking order of the N pressure sensor units may be determined based on the magnitude of the pressure elastic modulus. For example, FIG. 7 illustrates an example of stacking a plurality of pressure sensor units in ascending order of the pressure elastic modulus of the plurality of pressure sensor units. That is, the pressure sensor unit of the top layer among the N pressure sensor units has a lowest pressure elastic modulus, the pressure sensor unit of the bottom layer among the plurality of pressure sensor units has a highest pressure elastic modulus, and the plurality of pressure sensor units may be stacked in descending order of the pressure elastic modulus based on the pressure sensor unit of the bottom layer.

In addition, the material of each of the N pressure sensor units may be a textile material generated using one method of weaving, knitting, and embroidery, and the fiber constituting the textile of each of the N pressure sensor units may be a conductive fiber or generated by impregnating or printing conductive particles in an insulating fiber. In this case, the N pressure sensor units may be generated separately from each other and then stacked on each other, respectively, and preferably, the N pressure sensor units may be manufactured at once in a stacked structure through a continuous process.

In addition, an example of forming the multilayer structure based on the pressure elastic modulus has been described above, but according to another exemplary embodiment of the present disclosure, the pressure sensor may also be configured by varying the amount of conductive particles in each layer. That is, a pressure sensor unit made of fibers containing a large amount of conductive particles may be disposed on the upper layer to increase the pressure sensitivity, and a pressure sensor unit made of fibers containing a small amount of conductive particles may be disposed on the lower layer to decrease the pressure sensitivity.

FIG. 8 is a diagram illustrating a flowchart of a method for manufacturing a pressure sensor according to an exemplary embodiment of the present disclosure. Hereinafter, a process performed for each step will be described.

First, in step 810, textiles stacked in multiple layers are integrally generated.

FIG. 9 is a diagram for describing a concept for generating integrally textiles stacked in two layers.

Referring to FIG. 9, in step 810, fiber yarns are woven with a different density in each layer. Here, one method of weaving, knitting, and embroidery may be used. Accordingly, the textiles stacked in multiple layers may be generated in one process.

In this case, the fiber yarn may be an insulating fiber yarn or a conductive fiber yarn, the fiber yarn of each layer may be a fiber yarn of the same material, and the amount of conductive particles per unit area is the same. If the fiber yarn is the conductive fiber yarn, the method of manufacturing the pressure sensor is completed through step 810, and if the fiber yarn is the insulating fiber yarn, step 820 is further performed. That is, when the fiber yarn is the insulating fiber yarn, in step 820, the conductive particles are impregnated or printed in the stacked textiles. At this time, when the impregnation is used, the conductive particles may be impregnated by dipping and then removing the stacked textiles into and from a solution containing the conductive particles.

Therefore, a plurality of layers woven from conductive fiber yarns or a plurality of layers woven from insulating fiber yarns containing conductive particles constitute a plurality of pressure sensor units, and the pressure elastic modulus of each of the plurality of pressure sensor units is different from each other due to the density difference.

For example, when the pressure sensor is stacked in two layers, a first layer in which the fiber yarns are densely present has a high pressure elastic modulus, and a second layer in which the fiber yarns are coarsely present has a low pressure elastic modulus. Accordingly, the method according to the present disclosure may manufacture the pressure sensor as illustrated in FIG. 5.

The exemplary embodiments of the method for manufacturing the pressure sensor according to the present disclosure have been described so far, and the configuration of the pressure sensor 500 described above with reference to FIGS. 5 to 7 can be applied to the present exemplary embodiment as it is. Thus, more detailed description will be omitted.

FIG. 10 is a diagram illustrating a schematic configuration of a strain sensor according to an exemplary embodiment of the present disclosure.

Referring to FIG. 10, a strain sensor 1000 according to an exemplary embodiment of the present disclosure as a sensor for sensing tension in a horizontal direction may be used in wearable device products (shoes, clothes, bedding, etc.), biosensors, and the like, and includes a first strain sensor unit 1010 and a second strain sensor unit 1020.

The first strain sensor unit 1010 is one strain sensor and disposed at a left side of the strain sensor 1000.

In this case, the first strain sensor unit 1010 may be made of a textile material generated by using one method of weaving, knitting, and embroidery, or may be made of a polymer material containing conductive particles. In addition, in the case of the textile material, a fiber constituting the textile may be a conductive fiber, or may be generated by impregnating or printing conductive particles in an insulating fiber.

In addition, the second strain sensor unit 1020 is also one strain sensor and disposed at a right side of the strain sensor 1000.

In this case, the second strain sensor unit 1020 may also be made of a textile material generated by using one method of weaving, knitting, and embroidery, or may be made of a polymer material containing conductive particles. In addition, in the case of the textile material, a fiber constituting the textile may be a conductive fiber, or may be generated by impregnating or printing conductive particles in an insulating fiber.

Hereinafter, for convenience of description, it is assumed that the first textile sensor unit 1010 and the second textile sensor unit 1020 are made of textile materials. However, the present disclosure is not limited thereto.

In other words, the strain sensor 1000 has a structure in which two different strain sensor units 1010 and 1020 having the same height are connected to be in contact with each other in a left and right direction. In this case, the first strain sensor unit 1010 and the second strain sensor unit 1020 may have the same height. In addition, the first strain sensor unit 1010 and the second strain sensor unit 1020 may be generated separately from each other and then connected to be in contact with each other, and the first strain sensor unit 1010 and the second strain sensor unit 1020 may also be manufactured at once to be connected to each other through a continuous process.

At this time, when the first strain sensor unit 1010 and the second strain sensor unit 1020 are generated separately from each other and connected to each other, a silver paste is applied between one surface of the first strain sensor unit 1010 and the other surface of the second strain sensor unit 1020 that are in contact with each other, and the first strain sensor unit 1010 and the second strain sensor unit 1020 may be stitched by conductive yarns to be connected to each other.

In the case of using the continuous process, the manufacturing of the first strain sensor unit 1010 and the second strain sensor unit 1020 will be described in detail in the following "a method for manufacturing a strain sensor".

On the other hand, the first strain sensor unit 1010 and the second strain sensor unit 1020 have a tension elastic modulus (that is, modulus) of a specific magnitude, which may be adjusted. In addition, the tension sensitivity of the first strain sensor unit 1010 and the second strain sensor unit 1020 may be adjusted by adjusting the tension elastic modulus. That is, when the tension elastic modulus is low and a drape property is high, the tension sensitivity and a gauge factor are high, and when the tension elastic modulus is high and the drape property is low, the tension sensitivity and the gauge factor are low.

According to an exemplary embodiment of the present disclosure, the tension elastic modulus of the first strain sensor unit 1010 and the tension elastic modulus of the second strain sensor unit 1020 may be different from each other. Through this, there is an advantage of widening the range of the sensing tension of the strain sensor 1000.

More specifically, the first strain sensor unit 1010 has a tension elastic modulus of a first magnitude, the second strain sensor unit 1020 has a tension elastic modulus of a second magnitude, and the first magnitude may be smaller than or larger than the second magnitude. FIG. 3 illustrates an example in which the first magnitude is smaller than the second magnitude.

In this case, referring to FIGS. 11A, 11B and 11C, in the case of connecting a strain sensor unit having a low tension elastic modulus to a left side and connecting a strain sensor unit having a high tension elastic modulus to a right side (FIG. 11A), when the minimum tension is applied to the strain sensor 1000, the strain sensor unit having the low tension elastic modulus (i.e., the first strain sensor unit 1010) senses a change in tension so that the sensor responds even at the minimum tension (FIG. 11B). In addition, when the maximum tension is applied to the strain sensor 1000, both the strain sensor unit having the low tension elastic modulus (i.e., the first strain sensor unit 1010) and the strain sensor unit having the high tension elastic modulus (i.e., the second strain sensor unit 1020) sense a change in tension (FIG.

11C). Therefore, there is an advantage that the strain sensor 1000 is able to sense both the minimum tension and the maximum tension (multi-sensor) and has a wider range of the sensing tension.

In other words, if the strain sensors with different tension sensitivities are connected to be in contact with each other and then manufactured as one strain sensor, which is a multi-gauge factor flexible sensor, it is possible to manufacture a high-efficiency sensor in which the resistance is changed even at the maximum tension while the resistance is changed at the minimum tension. In addition, the strain sensor may be manufactured as a customized strain sensor according to a performance range required by the user.

Meanwhile, the tension elastic moduli of the first strain sensor unit 1010 and the second strain sensor unit 1020 may be adjusted by controlling the fiber density of the same fiber yarn or the tension elastic moduli of the first strain sensor unit 1010 and the second strain sensor unit 1020 may be adjusted by using different fiber yarns.

According to the exemplary embodiment of the present disclosure, in the case of using the same fiber yarn, the tension elastic modulus may be adjusted by equalizing the amount of conductive particles per unit area and varying the fiber density. For example, the first strain sensor unit 1010 may increase the fiber density, and the second strain sensor unit 1020 may decrease the fiber density. In this case, the strain sensor unit having a smaller density of the insulating fiber may increase the number of impregnation times and the number of printing times to equalize amount of conductive particles per unit area.

According to another exemplary embodiment of the present disclosure, in the case of using different fiber yarns, the first strain sensor unit 1010 may be formed of a fiber yarn (for example, nylon fiber yarn) having a large tension elastic modulus and the second strain sensor unit 1020 may be formed of a fiber yarn (for example, polyurethane fiber yarn) having a small tension elastic modulus. At this time, the amount of conductive particles per unit area is the same.

In addition, the contents described above may also be applied to a strain sensor having a structure in which at least three strain sensor units are connected to be in contact with each other.

FIG. 12 illustrates a strain sensor which connects N strain sensor units (N is an integer of 2 or more) to each other.

Referring to FIG. 12, in the strain sensor, N strain sensor units having the same height may be connected to be in contact with each other, and the tension elastic modulus of each of the N strain sensor units may be different from each other.

In this case, the connecting order of the N strain sensor units may be determined based on the magnitude of the tension elastic modulus. That is, the N strain sensor units may be connected to each other in ascending order of the tension elastic modulus, or the N strain sensor units may be connected to each other in descending order of the tension elastic modulus.

In addition, the material of each of the N strain sensor units may be a textile material or a polymer material generated by using one method of weaving, knitting, and embroidery.

In addition, in the case of the textile material, a fiber constituting the textile of each of the N strain sensor units may be a conductive fiber, or may be generated by impregnating or printing conductive particles in an insulating fiber. In this case, the N strain sensor units may be generated separately from each other and then connected to each other, respectively, and the N strain sensor units may be manufactured at once to be connected to each other through a continuous process.

In addition, an example of the present disclosure has been described above based on the tension elastic modulus, but according to another exemplary embodiment of the present disclosure, the strain sensor may also be configured by varying an amount of conductive particles in each column. At this time, the strain sensor unit having the high tension elastic modulus corresponds to the strain sensor unit made of a fiber containing a small amount of conductive particles, and the strain sensor unit having the low tension elastic modulus corresponds to the strain sensor unit made of a fiber containing a large amount of conductive particles.

FIG. 13 is a diagram illustrating a flowchart of a method for manufacturing a strain sensor according to an exemplary embodiment of the present disclosure. Hereinafter, a process performed for each step will be described.

First, in step 1310, textiles connected to be in contact with each other in multiple columns are integrally generated.

FIG. 14 is a diagram for describing a concept for generating integrally textiles connected to be in contact with each other in two columns.

Referring to FIG. 14, in step 1310, fiber yarns are woven at a different density in each column. Here, one method of weaving, knitting, and embroidery may be used. Accordingly, the textiles connected to each other in multiple columns may be generated in one process.

In this case, the fiber yarn may be an insulating fiber yarn or a conductive fiber yarn, the fiber yarn of each column may be a fiber yarn of the same material, and the amount of conductive particles per unit area is the same. If the fiber yarn is the conductive fiber yarn, the method of manufacturing the strain sensor is completed through step 1310, and if the fiber yarn is the insulating fiber yarn, step 1320 is further performed. That is, when the fiber yarn is the insulating fiber yarn, in step 1320, the conductive particles are impregnated or printed in the connected textiles. At this time, when the impregnation is used, the conductive particles may be impregnated by dipping and then removing the connected textiles into and from a solution containing the conductive particles.

Therefore, a plurality of columns woven from conductive fiber yarns or a plurality of columns woven from insulating fiber yarns containing conductive particles constitute a plurality of strain sensor units, respectively, and the tension elastic modulus of each of the plurality of strain sensor units is different from each other due to the density difference.

For example, when the strain sensors are configured in two columns, a left side in which fiber yarns are densely present has a high tension elastic modulus and a right side in which fiber yarns are coarsely present has a low tension elastic modulus. Accordingly, the method according to the present disclosure may manufacture the strain sensor as illustrated in FIG. 3.

The exemplary embodiments of the method for manufacturing the strain sensor according to the present disclosure have been described so far, and the configuration of the strain sensor 1000 described above in FIGS. 10 to 13 can be applied even to the present exemplary embodiment as it is. Thus, more detailed description will be omitted.

As described above, the present disclosure has been described by specified matters such as detailed components, and the like and limited exemplary embodiments and drawings, but the description is just provided to assist more overall understanding of the present disclosure and the present disclosure is not limited to the exemplary embodiment and various modifications and changes can be made by those skilled in the art from such a disclosure. Therefore, the spirit of the present disclosure should not be defined only by the described exemplary embodiments, and it should be appreciated that claims to be described below and all which are equivalent to the claims or equivalently modified to the claims are included in the scope of the spirit of the present disclosure.

The invention claimed is:

1. A pressure sensor for sensing pressure in a vertical direction comprising:
   a plurality of pressure sensor units stacked in multiple layers,
   wherein at least one of a pressure elastic modulus and an amount of conductive particles per unit area of each of the plurality of pressure sensor units is different from each other,
   wherein a stacking order of the plurality of pressure sensor units is determined based on a magnitude of the pressure elastic modulus or the amount of conductive particles per unit area of each of the plurality of pressure sensor units,
   wherein the plurality of pressure sensor units have textile materials comprising;
   a same fiber yarn, the pressure elastic modulus of the plurality of pressure sensor units is adjusted by varying a density of the fiber yarn and by equalizing the amount of conductive particles per unit area, or
   different fiber yarns, the pressure elastic modulus of the plurality of pressure sensor units is adjusted by using fiber yarns having a different pressure elastic modulus, and the amount of conductive particles per unit area of each of the plurality of pressure sensor units is the same.

2. The pressure sensor of claim 1, wherein, the textile materials comprise the same fiber yarn, such that a pressure sensor unit is configured to have a low density of a fiber yarn by increasing a number of impregnation times and printing times to equalize the amount of conductive particles per unit area.

3. The pressure sensor of claim 1, wherein the plurality of pressure sensor units are stacked in ascending order of the pressure elastic modulus of the plurality of pressure sensor units or in descending order of the amount of conductive particles per unit area.

4. The pressure sensor of claim 1, wherein the fiber yarn constituting the textile materials of each of the plurality of pressure sensor units is a conductive fiber yarn or an insulating fiber yarn and the plurality of stacked pressure sensor units are manufactured through a continuous process.

5. The pressure sensor of claim 4, wherein the plurality of stacked pressure sensor units are generated by impregnating or printing conductive particles in the insulating fiber yarn woven at different densities in each layer.

6. The pressure sensor of claim 4, wherein a pressure sensor unit having a smaller density of the insulating fiber yarn increases a number of impregnation times and a number of printing times to increase the amount of conductive particles.

7. The pressure sensor of claim 4, wherein the plurality of stacked pressure sensor units are made of the same conductive fiber yarn woven at different densities in each layer through one process.

8. A strain sensor for sensing tension in a horizontal direction comprising:
   a plurality of strain sensor units connected to be in contact with each other in a left and right direction,
   wherein at least one of a tension elastic modulus and an amount of conductive particles per unit area of each of the plurality of strain sensor units is different from each other,
   wherein a connecting order of the plurality of strain sensor units is determined based on a magnitude of the tension elastic modulus or the amount of conductive particles per unit area,
   wherein the plurality of strain sensor units are connected to be in contact with each other in the left and right direction in ascending or descending order of the magnitude of the tension elastic modulus or in ascending or descending order of the amount of conductive particles per unit area,
   wherein the plurality of strain sensor units have textile materials comprising;
   a same fiber yarn, the tension elastic modulus the plurality of strain sensor units is adjusted by varying a density of the same fiber yarn and by equalizing the amount of conductive particles per unit area, or
   different fiber yarns, the tension elastic modulus of the plurality of strain sensor units is adjusted by using fiber yarns having a different tension elastic modulus, and the amount of conductive particles per unit area of each of the plurality of strain sensor units is the same.

9. The strain sensor of claim 8, wherein the fiber yarn constituting the textile materials of the plurality of strain sensor units is a conductive fiber or is generated by impregnating or printing conductive particles in an insulating fiber yarn.

10. The strain sensor of claim 8, wherein, the textile materials comprise the same fiber yarn, wherein the strain sensor units have a smaller density of an insulating fiber yarn by increasing a number of impregnation times and printing times to equalize the amount of conductive particles per unit area.

11. The strain sensor of claim 8, wherein the plurality of strain sensor units connected to be in contact with each other are manufactured through a continuous process.

12. The strain sensor of claim 11, wherein the plurality of strain sensor units connected to be in contact with each other are generated by impregnating or printing conductive particles in an insulating fiber yarn woven at different densities in each column.

13. The strain sensor of claim 12, wherein a strain sensor unit having a smaller density of the insulating fiber yarn increases a number of impregnation times and a number of printing times to increase the amount of conductive particles per unit area.

14. The strain sensor of claim 11, wherein the plurality of strain sensor units connected to be in contact with each other are made of a same conductive fiber yarn woven at different densities in each column through one process.

15. The strain sensor of claim 8, wherein a first strain sensor unit and a second strain sensor unit among the plurality of strain sensor units are connected to each other,
   wherein a silver paste is applied between one surface of the first strain sensor unit and the other surface of the second strain sensor unit which are in contact with each other, and the first strain sensor unit and the second strain sensor unit are stitched by conductive yarns to be connected to each other.

* * * * *